United States Patent [19]

Newlin et al.

[11] Patent Number: 4,613,980
[45] Date of Patent: Sep. 23, 1986

[54] SYSTEM FOR HIGH ACCURACY REMOTE DECODING

[75] Inventors: Larry L. Newlin; William L. Chapman, both of Ponca City, Okla.

[73] Assignee: Conoco Inc., Ponca City, Okla.

[21] Appl. No.: 646,792

[22] Filed: Sep. 4, 1984

[51] Int. Cl.[4] .............................................. H04L 7/04
[52] U.S. Cl. ................................... 375/116; 375/115; 340/146.2
[58] Field of Search ............... 375/115, 111, 117, 116, 375/114; 371/47, 67; 340/146.2; 364/728

[56] References Cited

U.S. PATENT DOCUMENTS

3,537,069 10/1970 Van de Houten .................. 375/116
4,112,498 9/1978 Reiner et al. ....................... 375/114

Primary Examiner—Benedict V. Safourek
Assistant Examiner—M. Huseman
Attorney, Agent, or Firm—Charles E. Quarton; Ronald J. Carlson

[57] ABSTRACT

An encode-decoder system for generating highly accurate, coinciding synchronizing signals at each of plural separated locations; for example, a system generating start signals for a seismic data acquisition system. The system transmits psuedo random code data over selected communication link to a respective position decoder which samples the incoming code and compares it with a standard code. If there can be established a predetermined number of successive code matches, an output start signal is enabled when the code match count first peaks and then decreases.

12 Claims, 6 Drawing Figures

SYSTEM FOR HIGH ACCURACY REMOTE DECODING

BACKGROUND OF THE INVENTION

1. Field of the Invention

The invention relates generally to digital encode and decode circuitry and, more particularly, but not by way of limitation, it relates to improvements in circuitry for serial storage of digital code for subsequent comparison in multiple parts to increase the speed within which a code can be verified. For example, the invention is utilized in a system for sychronizing the start signal to independent sweep generators of a seismic acquisition system.

2. Description of the Prior Art

The prior art includes a number of different encoder-decoder systems that are commercially available for use in the related seismic field. Such prior systems may incorporate a pseudo random code, phase shift tones, frequency shift tones, on-off tone signals and other sychronizing means, all of which prior systems have various degrees of reliability and timing accuracy. Some require lengthy transmissions over an associated communication link, and this type of system has poor accuracy and reliability in low signal-two-noise conditions.

Prior art of interest is U.S. Pat. No. 3,739,870 in the name of Pelton et al that teaches one form of prior art system that requires extended transmission over a communications link in order to establish a code verification. This system utilizes a pseudo random code of 128 code bits with 0.9765 milliseconds bit duration thereby establishing a total code length of 125 ms. The decoder then samples the code at a 245.09 μs rate to give four samples per bit with 512 bits in shift register storage. Data shift and comparison is then carried out at a 2.097 megahertz rate with a maximum timing error of 245 μs. Such timing accuracy is not acceptable for use with vibrator sources that use higher transmission frequencies in the seismic band because the starting phase of the various sweep generators is too great with the 245 μs timing accuracy. Thus, in pursuing the same method, an increase of 4-to-1 in accuracy would require clocking frequencies of 16-to-1 or 33.574 megahertz. Speeds applicable in the 33 megahertz range would require multilayer printed circuit boards, special techniques, special logic chips and other compromises that are impractical. Accordingly, the present invention strives to reduce such starting phase difference without such penalties.

SUMMARY OF THE INVENTION

The present invention relates to an encoder-decoder system for effecting transmission of an accurate precise control signal from one location to one or more remote locations. A pseudo random code is transmitted over various communication links to one or more decoders, and the decoder samples the incoming code for comparison with a standard code to establish degree of identity. If the code comparison proves a predetermined or threshold number of code matches, an output is enabled when the code match count peaks and then decreases, and such output can be used to sychronize, start or otherwise control external systems with a high degree of timing accuracy.

The code data is sampled 16 times per code bit and serially loaded into 2048 bits (samples) of shift register storage. A standard code of 16 samples per bit is also serially loaded into a parallel 2048 bits of shift register storage. The data and standard codes are then shifted and compared in four parts of 512 bits (samples) each for output to summation and accumulator circuitry to establish peak comparison and define code match through first decrease for output of the sychronizing signal.

Therefore, it is an object of the present invention to provide a system for effecting transmission of control signals to remote locations with greatly increased timing accuracy.

It is also an object of the present invention to provide a sychronizing signal transmission system that is highly effective and accurate under noisy circuit conditions.

It is yet another object of the present invention to provide a high accuracy remote decoder that is compatible with other available encoders in the related seismic field that utilize identical codes.

Still further it is an object of the present invention to provide a high reliability control code link for sychronization of vibrators and recording equipment in seismic data acquisition systems.

Finally, it is an object of the present invention to provide a decoding system that transmits a high accuracy sychronizing coordination without undue expense and/or requirement of specialized higher frequency techniques.

Other objects and advantages of the invention will be evident from the following detailed description when read in conjunction with the accompanying drawings which illustrate the invention.

BRIEF DESCRIPTION OF THE DRAWINGS

FIG. 6 is a block diagram of encode-decode control logic and clock circuitry as utilized in the present invention.

DETAILED DESCRIPTION OF THE INVENTION

Figure 1:
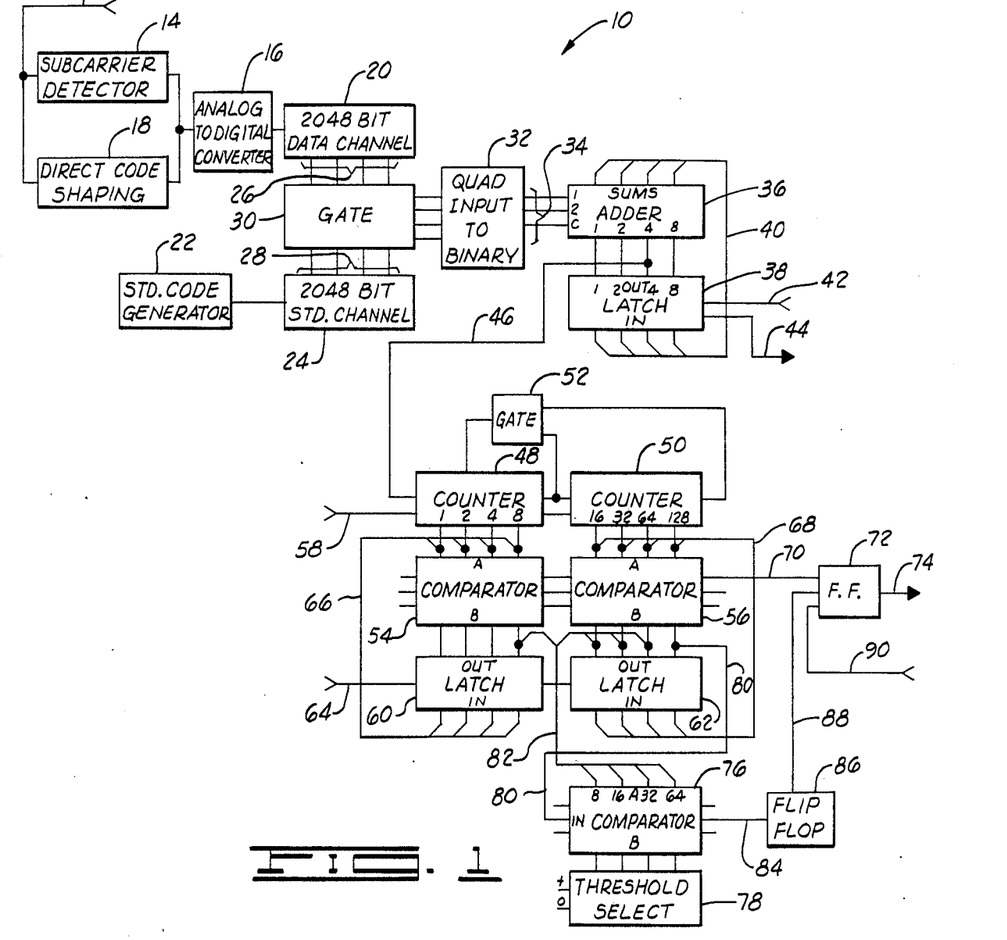
FIG. 1 is a block diagram of decoder circuitry constructed in accordance with the present invention.

FIG. 1 illustrates a decoder 10 such as may be located in each of one or more remote installations, e.g. a seismic vibrator truck. Code data input 12 may receive transmitted signals for input and processing through a subcarrier detector 14 to an analog to digital converter 16. Alternatively, wire line, recording or other input may be applied via input 12 through direct code shaping circuitry 18 to the converter 16. Output from converter 16 of the code data is then applied as input to a 2048 bit shift register 20, the data channel shift register.

A standard code generator 22 of known and commercially available type applies standard code at similar timing to a 2048 bit shift register 24, the standard channel shift register. Each of the data channel and standard channel shift registers 20 and 24 are 4-part shift registers, i.e. 4 parts of 512 bits each, as will be further described below, and the individual outputs, respective line groups 26 and 28, are applied to a gate circuit 30, a Quad EXCLUSIVE-OR gate as will be further described below.

The respective four outputs from EXCLUSIVE-OR gate 30 are then applied through a Quad input to binary circuit 32. The Quad input to binary circuit 32 is a conventional form of logic circuitry that converts the four-line output from gate circuit 30 to binary outputs 34, the $2^0$, $2^1$ and Carry A inputs of a 4-bit binary adder 36. The Quad to binary circuit 32 may be constructed of an OR gate logic input to a type 74LS283 4-bit adder operating through a type 74LS175 4-bit latch to provide the respective binary outputs. The adder 36 may also be a type 74LS283 as it functions in coaction with a latch circuit 38, type 74LS175. The sum outputs from adder 36 are applied via line 40 to the inputs of latch 38 as the binary output of latch 38 is connected back to the 1, 2, 4 and 8 terminals of adder 36. Latch control signal at 8.533 megahertz is input at lead 42 from the clock circuitry (to be described) and reset to zero signal input is provided on lead 44, reset occurring at 61 μs intervals. A lead 46 from 4-output of adder 36 provides a pulse every eighth count for input to a counter 48 of the accumulator circuitry.

Counters 48 and 50, each type 74LS161 4-bit counters, are connected serially and sequence controlled by a flip flop 334 (FIG. 6) to accumulate count at eight binary outputs to inputs A of respective comparators 54 and 56, each type 74LS85. Reset to counters 48 and 50 is applied at input 58, and this is a delayed 61 μs pulse input. The gate circuit 52 functions to stop counters 48 and 50 at a count of 255.

The B connections of comparators 54, 56 are connected to the outputs of respective latch circuits 60 and 62, each type 74LS175, and latch control is provided at 61 μs intervals at latch control input 64. The binary counter outputs from counters 48 and 50 on lead lines 66 and 68 are input to the respective latch circuits 60 and 62. Comparator output from comparator 56 on lead 70 is an A less than B signal for input to a flip flop 72 that provides final control output via lead 74 for application to the encoder circuitry, as will be further described.

A comparator 76, also a type 74LS85, operates in conjunction with a threshold select switch 78 (front panel) to provide an adjustable threshold function. The 128 most significant bit output from latch 62 on line 80 is applied as an A equals B input to the comparator 76. The four A inputs of comparator 76 are connected on line 82 from the 8, 16, 32 and 64 counter outputs from respective latches 60 and 62, and the corresponding B inputs of comparator 76 are connected to the binary output connections of the binary panel switch or threshold select 78. Thus, when the A input matches the B inputs to comparator 76, an A equals B output on line 84 sets a flip flop 86 which then enables flip flop 72 via line 88 so that flip flop 72 will set when the A is less than B output line 70 from correlation comparator 56 goes high and then low. The flip flop 72 then provides output on lead 74 to start external systems. A 61 μs set pulse is re-input via lead 90 to reset flip flop 72.

Figure 2:
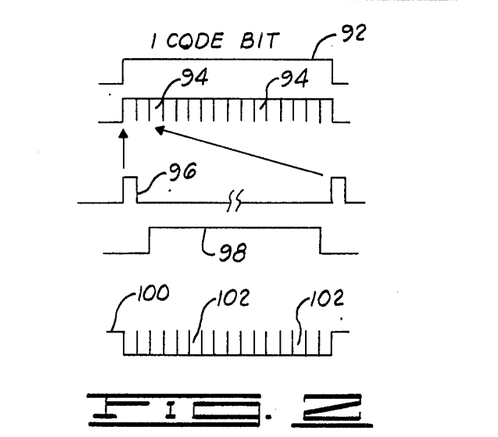
FIG. 2 is a graphic illustration of waveform versus time illustrating various code bit and sample relationships.
Figure 5:
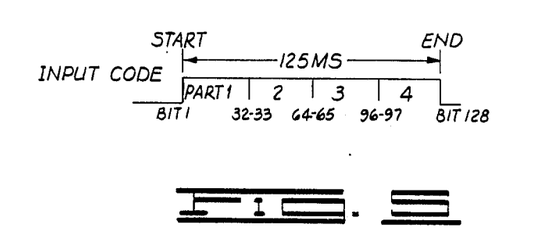
FIG. 5 is a graphic illustration of code parts versus time for a 128 bit data code as utilized in the present system.

FIG. 2 depicts some waveform graphics relating to the pulse timing of the decoding system. One input code bit 92 has a duration of 0.9765 ms, there being 128 serial bits 92 in the data code total, as shown in FIG. 5. Each code bit 92 is then further divided into 16 samples or data bits 94 of approximately 61 μs duration. The sample new data control pulse 96 is repeated every 61 μs and controls the cycling of data bit sampling in the data channel to increment samples 94. The recirculate and correlation cycle of the decoder is controlled by a pulse 98 of 60 μs duration and, with the standard channel configured also to include 16 data bits 102, both the data and standard code channels recirculate at a rate of 0.117 μs per data bit which cycles through 512 data bits in 60 μs.

Figure 3:
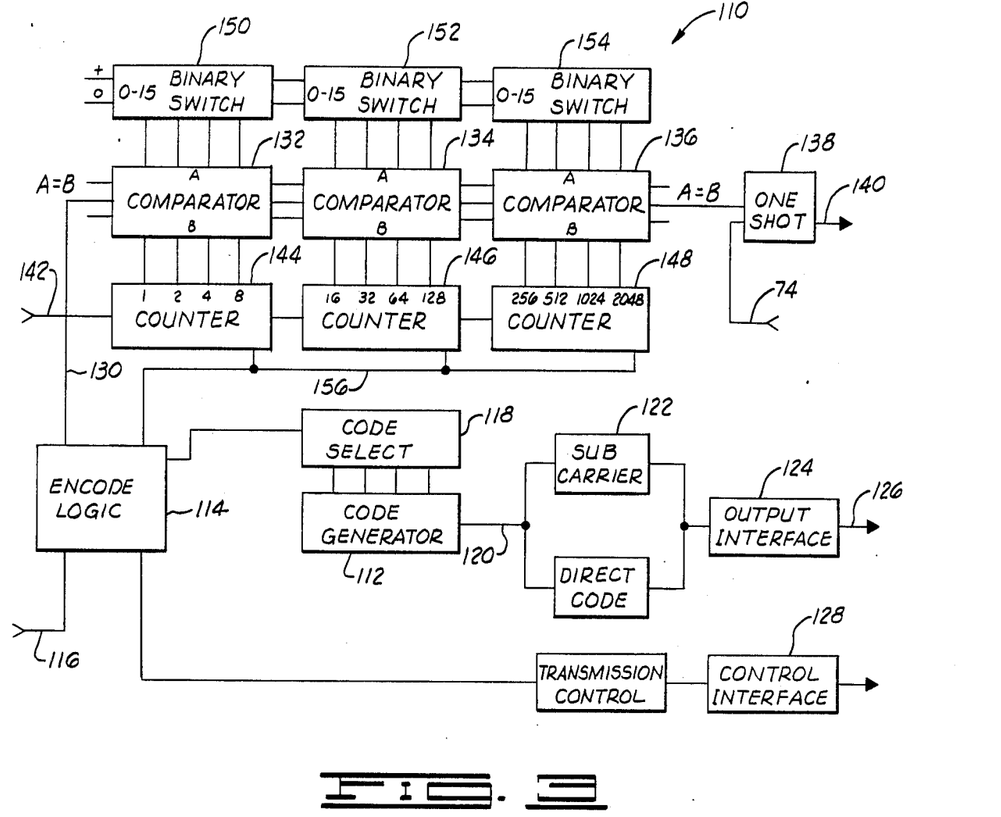
FIG. 3 is a block diagram of encoder circuitry as utilized in the present system.

FIG. 3 illustrates the essential structure of encoder 110 as constructed in accordance with the present invention. The encoder circuitry 110 would be included at the primary or central control position, or, in the case of a seismic data acquisition system, it would be placed in the data recording truck. Circuitry 110 includes a code generator 112 of conventional type, the system internal code generator, and code generator 112 functions both to load the standard code into the standard shift register channel 24 as well as to output code when in the encode function. Thus, in one mode, code generator 112 functions as standard code generator 22 (FIG. 1) to input the standard code to the shift register channel 24. In an alternate mode, code generator 112 outputs a selected code, and there may be a number of such codes available by switching. Internal auto-polarity selection is electronically switched to load or encode the correct polarity. Clock switching will occur that selects 1024 Hz for the encode function, and 0.533 megahertz for loading of the standard channel. This portion of the circuitry may also be programmed to encode and decode in various sequential functions as selected.

The encode logic 114 controls system operation in response to an encode start input 116, e.g. switch actuation or the like. Thus, the code select stage 118 is actuated to control generator 112 for output of selected code data bits on line 120. The code output on line 120 is then available for modulation on a subcarrier as at stage 122 and subsequent conduction through an output interface 124 to a transmission code output 126 for transmission over any type of communication link having voice bandwidths. Code output on line 120 may also be applied through output interface 124 for transmission to the decode circuitry. Transmission control function from logic 114 may also be communicated through other form of control interface 128 to the decode system.

The encode circuitry 110 employs a variable timing circuit that outputs an external start pulse after a time period determined by a front panel binary switch setting.

The start pulse delay is selectable in 61 μs increments to 250 ms, and it occurs after the encode function has been effected. Thus, encode output from encode logic 114 is applied on line 130 to the A equals B input of cascade-connected comparators 132, 134 and 136, each type 74LS85. Clock input at a rate of 16,384 Hz (61 μs) is applied as input on line 142 to series-connected binary counters 144, 146 and 148, each having its respective binary outputs connected to the B inputs of respective comparators 132, 134 and 136. The A inputs to comparators 132, 134 and 136 are the binary outputs from respective front panel binary switches 150, 152 and 154 which select a setting for time zero in 61 μs increments. The respective counters 144–148 are reset by line 156 from encode logic 114. A equals B output from comparator 136 is applied to a one-shot multivibrator 138 which, also receiving enabling input from the flip flop decoder output on line 74 (FIG. 1), is actuated to output a sweep start or time zero pulse on line 140. The respective counters 144–148 are reset via line 156 from encode logic 114.

Figure 4:
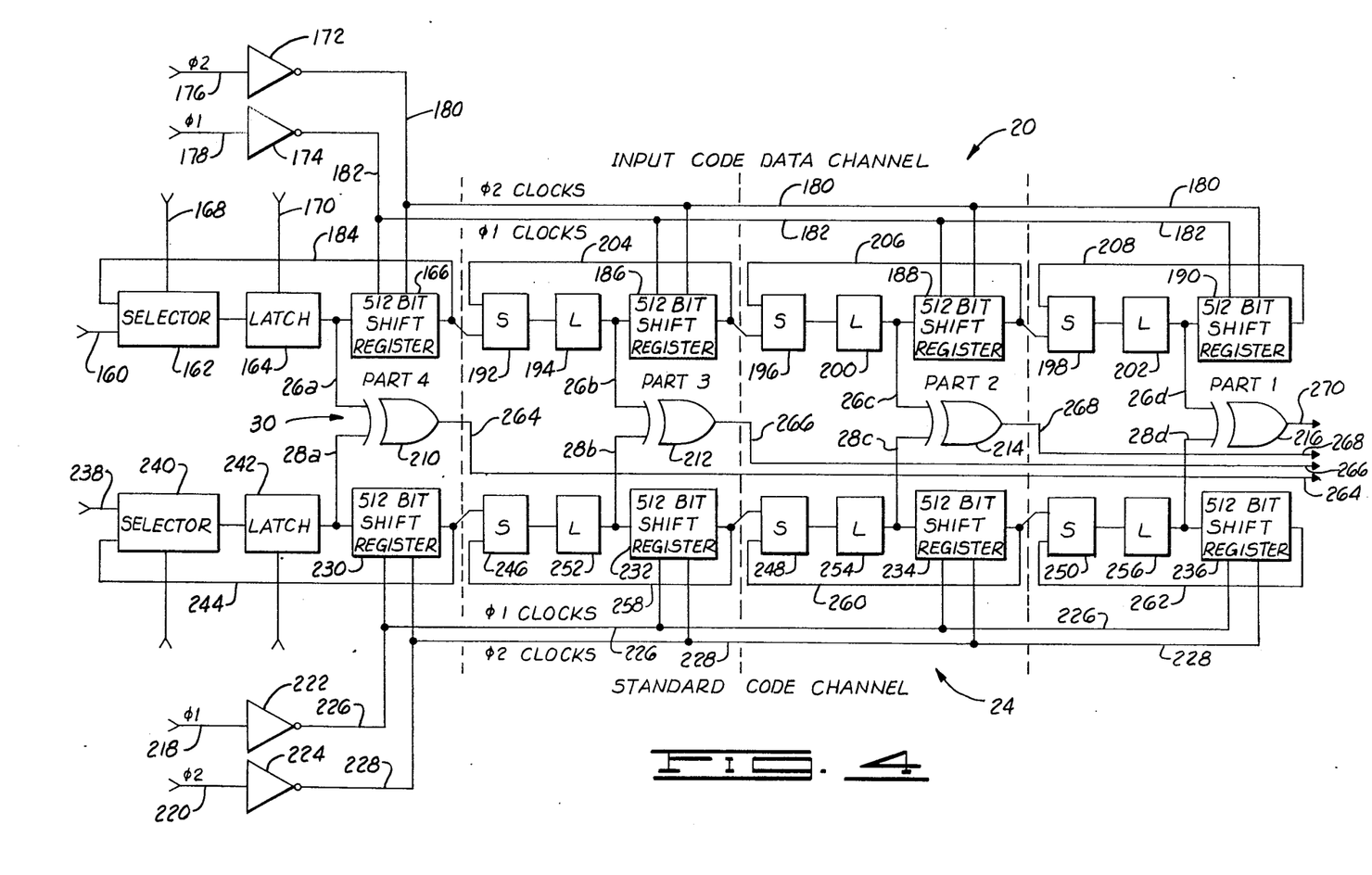
FIG. 4 is a block diagram of shift register and comparator circuitry as utilized in the decoder circuitry of FIG. 1.

FIG. 4 illustrates the data channel and gate circuitry of FIG. 1 in greater detail. Thus, selected code data from the analog to digital converter 16 (FIG. 1) is input via lead 160 to a selector 162, a type 74LS157 Quad 2-line to 1-line data selector, as output is applied to a latch circuit 164, type 74S175 4-bit latch, with subsequent pulse input to a 512 bit shift register 166. A 61 μs pulse input to selector 162 on lead 168 controls load/-shift select position of selector 162, and input on line 170 to latch 164 is a latch pulse at the 8.533 megahertz frequency. The shift register 166 is a type 2803 dual 512 bit shift register comprised of two 256 bit registers with common gated input, output and common 2-phase clocks. Respective type 0026 clock drivers 172 and 174 receive opposite phase clock inputs at leads 176 and 178 from the clock circuitry, as will be further described, and the phase 2 and phase 1 clock signals are output on lines 180 and 182 for control of the four shift registers in the code data channel. Clock signals on 180 and 182 are at a frequency of 4.267 megahertz and total 513 clock pulses for controlling the respective code data channel shift registers to function at twice normal speed. That is, in each 512 bit shift register such as register 166, phase 1 pulse will input and output data on one 256 bit register while shifting data in the other 256 bit register, and phase 2 input will input and output data on the other 256 bit register while shifting data in the first 256 bit register. In effect, this allows two 4.267 megahertz clocks to shift data at an 8.533 megahertz rate. Further, four of these 512 bit registers in cascade will then make up one 2048 bit channel as employed for each of the input code data and the standard code in respective channels 20 and 24.

Thus, and referring again to the input code data channel 20, shift register 166 is connected via lead 184 for recirculation with selector 162 and there is an identical configuration for each successive shift register 186, 188 and 190 in the code data channel 20. Output from shift register 166 is applied to a selector 192 and latch 194 as they function with shift register 186, and respective selectors 196, 198 are similarly connected with respective latches 200, 202 functioning with respective shift registers 188, 190. The phase 2 and phase 1 clocks are similarly applied to each cascaded shift register 186–190 and recirculation of each register is enabled by leads 204, 206 and 208. Outputs from the four cascaded register circuits are taken from the latch output at leads 26a through 26d for input to a respective EXCLUSIVE-OR gate 210, 212, 214 and 216.

Thus, as shown in FIG. 5, a total input code of 128 bits occurring in 125 μs is processed in four parts simultaneously through the shift registers 166, 186, 188 and 190. Each register shifts 32 code bits of the input code as 512 data bits, i.e. one-fourth of the total 2048 data bits of the shift register.

The standard code channel 24 is identically configured as it functions with 512 clock pulses as input at a frequency of 4.267 megahertz through phase 1 and phase 2 inputs 218 and 220 and respective clock drivers 222 and 224. Clock drivers 222 and 224, type 0026 driver circuits, provide output on lines 226 and 228 for control of each of cascade-connected 512 bit shift registers 230, 232, 234 and 236. A selected standard code, e.g. as from standard code generator 22 (FIG. 1), is applied at lead 238 through a selector 240 and latch 242 to the first shift register 230 in the cascade. A lead 244 is connected for recirculation. The remaining shift registers 232, 234 and 236 each function with respective selectors 246, 248 and 250 and respective latches 252, 254 and 256, as leads 258, 260 and 262 interconnect for recirculation of each register. Register outputs from respective latches 242, 252, 254 and 256 are applied via leads 28a–d for input to the EXCLUSIVE-OR gates 210, 212, 214 and 216, and gate outputs are applied out on respective leads 264, 266, 268 and 270 for input to the Quad input to binary converter 32 (FIG. 1).

FIG. 6 illustrates the control logic and clock circuitry that provides basic timing control of the encoder-decoder system. An oscillator 272, IC-type 74LS124, is tuned to generate an output at 4,194.304 kilohertz on lead 274 for input to series-connected counters 276 and 278. Counters 276 and 278 are each sychronous 4-bit counters, IC-type 75LS161, and output at 16,384 kilohertz counter 278 at pin 15 through an inverter 280 is available on lead 142 for input to A equals B input of counter 144 in the encoder counter string (FIG. 3). The 16,384 kilohertz rate is a 61.035 μs pulse interval.

An oscillator 282, also type 74LS124, is tuned to oscillate at 8,533.333 kilohertz as it provides pulse output via line 284 for input to a phase divider flip flop 286 that functions as a 2 to 1 divider providing two opposite phase outputs 288 and 290, each at 4.267 megahertz. The pin 9 output 288 and pin 7 output 290, phase 1 and phase 2 respectively, are applied to a selector 292, a type 74LS157 Quad 2-line to 1-line data selector. 1-line data is then output on leads 294, 296, 298 and 300 to the respective AND gates 302, 304, 306 and 308. The gates 302 and 304 are enabled by a high from pin 7 of a 513 clock pulse flip flop 309 on lead 310, the 61 μs system reset pulse, to output 513 clock driver pulses at phase 1 and phase 2 on respective leads 178 and 176 to the input code data channel 20 (See FIG. 4). In like manner, gates 306 and 308 are controlled by the 512 clock pulse flip flop 312 and output 313 to provide phase 1 and phase 2 outputs of 512 clock pulses via respective leads 218 and 220 to the standard code channel 24 (FIG. 4).

Yet another set-reset flip flop 314 receives input from oscillator 282 via line 284 and inverter 318 thereby to act as a one-shot and control the clock pulse width, i.e. the duty cycle, as an output 320 is applied to the strobe input pin 15 of selector 292. Output 170 provides 8.333 megahertz latch control. A flip flop 323 actuated by the 513 clock pulse flip flop 309 generates output on lead 325 that is applied to select control pin 1 of selctor 292. A flip flop 321 performs function of load standard channel as output from pin 7 is applied to 512 clock pulse flip flop 312 via lead 322. Alternate output on pin 9 of flip flop 321 on lead 324 is applied to oscillator 272 to kill the oscillator counter string during load mode. This also disables AND gate 326 and reset output on lead 328; however, 61 μs system reset is still available on lead 328 through AND gate 330 to reset lead 332. Actuation input 329 may also control the load standard flip flop 321.

Yet another flip flop 334 is actuated via lead 336 from pin 9 of the 513 clock flip flop 309 to provide a 61 μs delayed counter reset on lead 58 as applied to counters 48 and 50 (FIG. 1). A flip flop 340 is similarly energized by counter output at the 60 μs rate on a lead 342 to provide a 61 μs latch reset pulse on lead 64 to latch 60 (FIG. 1). All flip flop circuits are IC-type 74LS112 J-K flip flop.

A counter string for decode and load standard channel operation consists of counters 344, 346 and 348, each type 74LS161 sychronous 4-bit counters. Standard channel clock output on lead 350 from AND gate 308 is applied through an inverter 352 for input to 4-bit counter 344, the first counter in the series counter string. Pin 12 output from counter 344 on lead 354 is applied to the code generator during the load standard channel mode as a 533,333.31 kilohertz coding signal. A 512 clock signal at 16,667 kilohertz (60 μs) is then available from the second counter 346 on lead 356 for application to the 512 clock pulse flip flop 312. Finally, counter 348 provides a pin 13 output on a lead 358 to pin 13 of the load standard channel flip flop 321, this being a 240 μs pulse at a rate of 4166.67 hertz for 2048 counts in loading the standard channel. The counter string is reset via AND gate 360 when receiving enabling input on leads 310 and 328.

In operation, the invention can be used in diverse types of system wherein it is desirable to commence operation of two or more circuit functions simultaneously while eliminating or greatly minimizing any starting phase difference. This is particularly desirable in seismic data acquisition systems wherein one or more vibrator assemblies may be operated in close phase while recording truck operations should also commence with little or no time variation. In many cases, the data recorder truck is located on the order of miles from what is usually a plurality of further widely spaced vibrator trucks. In usual practice, sychronization of signals and sounding operations are carried out by radio transmission, generally information emanating from the recorder truck to sychronize and coordinate all vibrator trucks in the overall operation.

Thus, the recording truck may include the encode circuitry of FIG. 3 as well as control logic and clock circuitry as set forth in FIG. 6. The master control of the encode operation may reside with the operator in the recording truck as he can coordinate the entire operation and sequence of vibration transmissions. Actuation of encode start at input 116 effects serial generation of a code as selected by code select stage 118 and the generated code may then be transmitted by direct line or as modulated on a subcarrier 122, e.g. a 2 kilohertz subcarrier system for transmission to the vibrator trucks.

The operator also selects time zero by actuation of panel switches 150, 152 and 154 which provides a setting for time zero in 61 μs increments up to a total delay of 250 ms. This selected delay occurs after the encode function is completed. 61 μs sync pulses are input via lead 142 from the control logic (FIG. 6) and the comparator string functions to output a pulse from comparator 136 to the one-shot 138 when A equals B, i.e. when the binary switch count A equals the counter count B. Then, one-shot 138 is enabled by input on lead 74 as received from flip flop 72 (FIG. 1), the one-shot 138 is actuated to provide time zero sweep start signal out on lead 140.

In the respective vibrator trucks, the circuitry of FIG. 1 is effective to receive the code data transmission, detect and amplify data control signals and effect comparison of the data channel and standard code channel to derive the selected code sychronization pattern. The code pattern is proven as the circuitry of FIG. 1 samples the incoming code at code data input 12 every 61 μs for approximately 0.1 μs, and 16 samples or data bits are taken for each code bit. Thus, for 128 code bits, with 16 samples each, a total of 2048 samples or data bits are maintained through the correlator shift registers 20 and 24. The data channel 20 and the standard code channel 24 each contain dual 512 bit shift registers, i.e. four each as shown in FIG. 4. Each 512 register is comprised of two 256 bit registers with common gated inputs, outputs and common 2-phase clocks as provided by the respective phase 1 and phase 2 513 clock pulses on leads 182 and 180, and the phase 1 and phase 2 512 clock pulses on leads 226 and 228. The phase 1 clocks will input and output data on one 256 bit register while shifting data in the other and phase 2 functions alternatively. This allows the two 4.267 megahertz clocks to shift data at an 8.533 megahertz rate. Thus, four of the 512 bit registers in cascade make up one 2048 bit channel, and each of the input code channel 20 and standard code channel 24 is similarly comprised.

Data entering the register on a selected clock will exit on the same clock. The respective selectors for each 512 bit shift register are switched to input data serially through the registers or, alternatively, to recirculate data around each 512 bit register. The respective latches associated with each selector serve to hold data to satisfy timing through the respective register. The code data channel 20 and the standard code channel 24 are each controlled by separate phase 1 and phase 2 clock circuits as the data channel 20 receives 513 clock pulses while the standard code channel receives 512 clock pulses. The EXCLUSIVE-OR gates 210–216 compare outputs of each opposed pair of 512 bit registers, i.e. as between the data channel and the standard code channel, and the OR gate outputs are fed to accumulator circuitry consisting of binary adder 36 and counters 48 and 50.

There are 513 clock pulses fed to the data channel 20 as clock pulses 1–512 recirculate data for the correlation cycle. Clock pulse 513 then inputs a new data sample and advances all data one bit right as the end bit 2048 is discarded. During a correlation cycle, each 512 bit register is recirculated and the outputs are compared with the standard channel 24. This divides the 2048 bits into four 512 bit parts and all four registers are recirculated simultaneously in sychronization with the four parts in the standard channel registers. Thus, 2048 bits of data are compared in 60 μs, i.e. the duration for 512 clock pulses. The beginning clock pulse No. 1 is alternated after each cycle to load new data into each half of each 512 bit register.

The standard channel 24 operates in identical manner to the code data channel 20. It is serially loaded at 8.533 megahertz with a code of 128 bits at 0.533 megahertz timing frequency. This frequency ratio generates 2048 bits of code in opposite phase to the incoming code from standard code generator 22. Complete loading of the standard code requires approximately 240 μs and requires 2048 clock pulses. There are 512 clock pulses required in the recirculation and the outputs of the registers are in four parts corresponding to the data channel outputs. Loading of the standard code is performed on each of power turn-on, reset, and decode trigger output.

During each correlation cycle, outputs from the EXCLUSIVE-OR gates 210–216 are fed to the Quad to binary stage 32 and the binary outputs 34 are fed to the binary inputs of the adder 36. The sums from adder 36 are fed to the inputs of Quad latch 38 as controlled at the 8.533 megahertz data rate and the outputs from latch 38 are applied to the binary inputs of adder 36. After each cycle, a new sum is generated in adder 36 and fed to latch 38. The sum will continue to increase until the latch is reset at the 61 μs load pulse rate as input at lead 44. Lead 46 provides a pulse every eighth count for input to counters 48 and 50, the accumulator circuitry.

At this point, there are a maximum of 256 counts as the counter accumulates the correlation bits and it is reset to zero after each correlator cycle. Output from gates 52 terminate counting. The eight binary outputs from counters 48 and 50 are fed to latches 60 and 62 and to the A inputs of the two 4-bit binary comparators 54 and 56. Outputs from 60 and 62 are applied to the B inputs of comparators 54 and 56 and all data on the latch inputs are stored at the end of the correlation cycle whereupon the counters 48 and 50 are reset to zero. Thus, an output 70 on comparator 56 goes high when A is less than B and remains low in any other condition. The counter data is the current count while the latch outputs are the previous count.

An additional comparator 76 is used along with a 4-bit binary panel switch 78 to set a threshold function. Thus, the 128 MSB from latch 62 is fed to the A equal B input of comparator 76 and the four A inputs of comparator 76 are connected to the 8, 16, 32 and 64 counter outputs via lead group 82. The corresponding B inputs of comparator 76 are connected to the binary panel threshold select switch 78 and when the A input matches the B input to comparator 76, an A equal B output via lead 84 sets flip flop 86 which, in turn, enables a flip flop 72 to set when the A is less than B output of the correlation comparator 54-56 goes high and then low. The flip flop 72 triggers an output on lead 74 which is connected to the one-shot 138 (FIG. 3) to start all external systems. Thus, an output is possible when the threshold setting has been reached and the correlator count has reached a peak and then decreases. Having satisfied that condition, the system will trigger on the first 61 μs load pulse following such decrease in count.

While the foregoing discloses novel encode-decode circuitry for effecting essentially simultaneous actuation of diverse or separated systems, it should be understood that similar circuitry may be utilized in any of various applications wherein accurate timing is essential. The system of the present invention improves timing accuracy by four-to-one ratio while using lower frequencies of 8.533 megahertz. The data is sampled 16 times per bit and serially loaded into 2048 bits of shift register storage, and the code is then shifted and compared simultaneously in four parts of 512 bits each within 61 μs. The system may easily be altered to a timing accuracy of eight-to-one wherein 32 samples per bit are serially loaded into 4096 bits in shift register storage. This code is then compared in 16 parts of 256 bits each to allow timing accuracies down to 30.5 μs. While this system is attractive from the standpoint of the still further reduced timing error, it requires additional chip count in filling out the increased shift register storage.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are defined as follows:

1. A method for reliably producing accurate start signals at remotely disposed locations, comprising the steps of:
    selecting a time zero delay and initiating transmission from a first location of a selected data code of known duration less than said delay;
    producing a first start signal at said first location upon expiration of said time zero delay;
    receiving said selected data code at a second location and storing serial code bits for said duration;
    comparing said selected data code with a standard code stored as serial code bits by comparing successive bits for each of plural groups of bits simultaneously to derive a serial code match count;
    detecting first decrease in code match count indicative of complete code reception for the known duration; and
    producing a second start signal at said second location upon decrease of code match count that is in general coincidence with said first start signal.

2. A method as set forth in claim 2 wherein said step of comparing comprises:
    serially dividing the received stored data bits into a plurality of successive groups of data code bits and simultaneously comparing with a plurality of successive groups of standard code bits;
    gating out code bit comparison outputs for each successive bit of each group;
    summing the successive comparison outputs for all groups; and
    accumulating a count of the successive sums until the count does not advance indicating all code bits properly compared.

3. Apparatus for producing highly accurate start signals at remotely disposed locations, comprising:
    encoder means for selecting a time zero delay and initiating transmission from a first location of a selected data code of known duration less than said delay;
    means for producing a first start signal at said first location upon expiration of said time zero delay;
    means for receiving the selected data code at a second location and storing serial code bits for said duration;
    means for comparing said selected data code with a standard code stored as serial code bits by comparing successive bits for each of plural groups of bits simultaneously to derive a serial code match count output;
    means for detecting first decrease in match count output indicative of complete code reception for the known duration; and
    means for producing a second start signal at said second location upon match count output decrease that is in general coincidence with said first start signal.

4. Apparatus as set forth in claim 3 wherein said encoder means comprises:
    switch means providing a selected count output indicative of selected delay;
    counter means counting timing pulses at an incremental time rate to produce a timing pulse count output;
    comparator means comparing said selected count output and timing pulse count output to produce a count equal output to actuate said means for producing.

5. Apparatus as set forth in claim 4 wherein said encoder means further comprises:
  switch means for selecting a data code of a predetermined number of serial code bits; and
  means for transmitting said selected data code serial bits.

6. Apparatus as set forth in claim 3 wherein said means for receiving and storing comprises:
  plural shift register means connected to receive serial loading of said data code bits for storage, with each shift register means containing a selected different portion of the total data code bits; and
  means including latch means for selectively recirculating stored data code bits of each shift register means to generate plural successive compare outputs.

7. Apparatus as set forth in claim 6 wherein said means for comparing comprises:
  plural shift register means connected to receive serial loading of said standard code bits for storage, with each shift register means containing a selected different portion of the total standard code bits;
  means including latch means for selectively recirculating stored standard code bits of each shift register means to generate plural successive compare outputs; and
  gate comparison means receiving input of compare outputs for each respective pairs of data code and standard code shift register means to generate respective code match count outputs.

8. Apparatus as set forth in claim 7 wherein:
  each of said shift register means is a dual operation shift register wherein opposite phase clocks control simultaneous shift control of respective halves of the total bit capacity.

9. Apparatus as set forth in claim 8 wherein:
  each of said shift register means is a dual 512 bit shift register processing two 256 bit data groups simultaneously.

10. Apparatus as set forth in claim 3 wherein said means for detecting comprises:
  means for summing the successive match count output;
  means for counting a selected multiple of successive match count outputs to accumulate a code match total; and
  means generating an output in response to first detection of a decrease in said code match total.

11. Apparatus as set forth in claim 10 which further includes:
  switch means for selected a threshold input indicative of code match total; and
  comparator means receiving said threshold input to produce a code match enabling output to said means for producing.

12. Apparatus for generating an accurately timed sychronizing control signal comprising:
  means inputting a digital data code of selected number of code bits and duration;
  means inputting a digital standard code of said selected number of code bits and duration;
  a data shift register receiving serial input of said data code bits;
  a standard shift register retaining stored serial input of said standard code bits;
  first means controlling shift of said data code bits through the data shift register;
  second means controlling shift of said standard code bits through the standard shift register;
  gate means receiving input of said data code bits and standard code bits and generating a coincidence output for each code match;
  means for counting said coincidence outputs to store a successive code match count;
  means comparing current code match count with previous code match count to generate a trigger pulse upon count decrease; and
  circuit means responsive to said trigger pulse to generate said synchronizing control signal.

* * * * *